Oct. 13, 1931.　　　D. E. RICHARDSON　　　1,827,333
HIGH FREQUENCY WATTMETER
Filed Aug. 2, 1929　　2 Sheets-Sheet 1
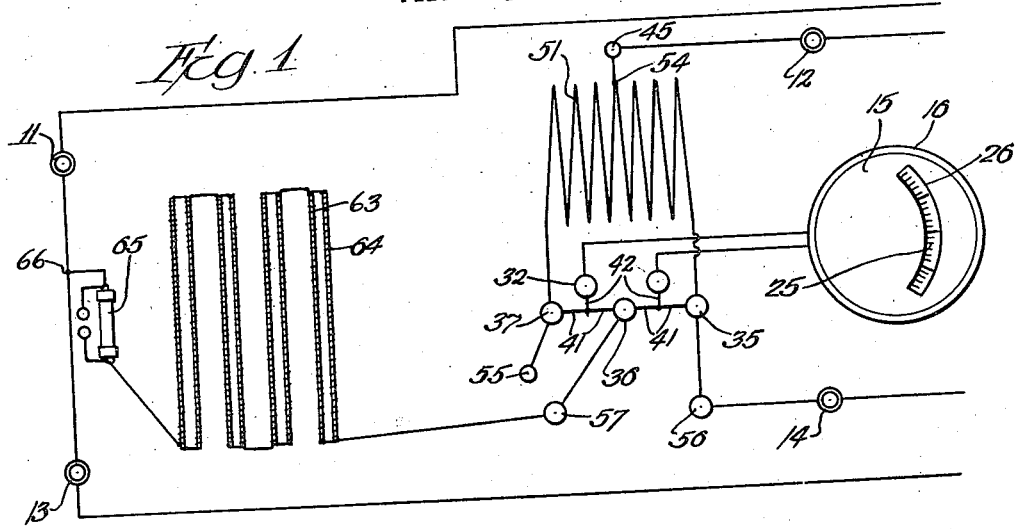
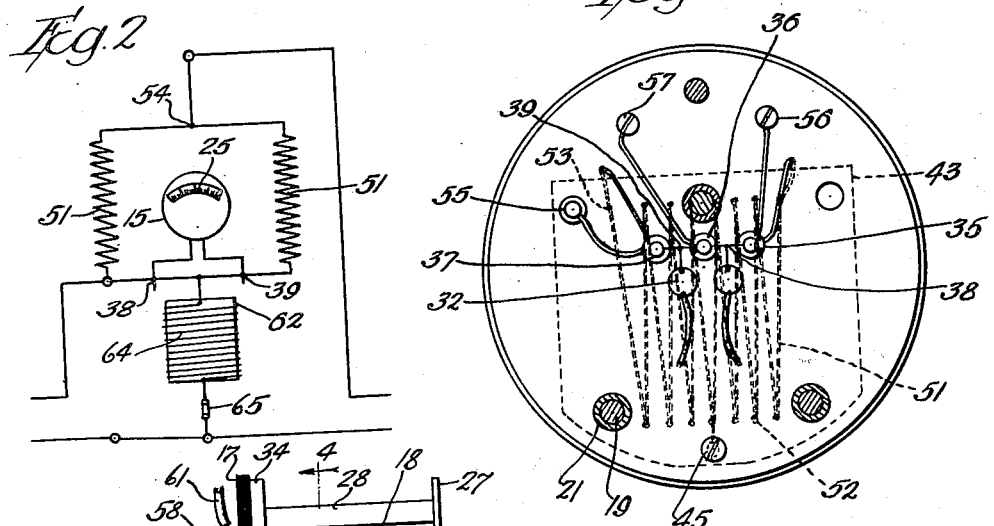
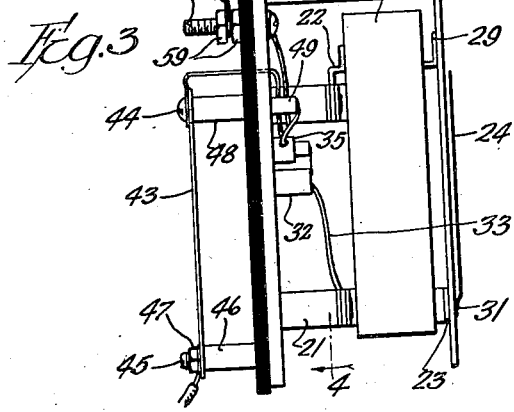
Inventor:
Donald E. Richardson
John C. Carpenter
Atty.

Oct. 13, 1931.    D. E. RICHARDSON    1,827,333
HIGH FREQUENCY WATTMETER
Filed Aug. 2, 1929    2 Sheets-Sheet 2

Inventor:
Donald E. Richardson
John C. Carpenter
Atty.

Patented Oct. 13, 1931

1,827,333

UNITED STATES PATENT OFFICE

DONALD E. RICHARDSON, OF CHICAGO, ILLINOIS, ASSIGNOR TO H. G. FISCHER & CO. INC., OF CHICAGO, ILLINOIS, A CORPORATION OF ILLINOIS

HIGH FREQUENCY WATTMETER

Application filed August 2, 1929. Serial No. 383,075.

This invention relates in general to electrical measuring instruments for high frequency circuits, and has more particular reference to an electro therapeutic wattmeter for accurately measuring the heat energy and power supplied to a patient.

While it is comparatively a simple operation to accurately measure alternating current power of ordinary commercial frequencies and to calculate therefrom the heat energy produced by this electrical power, the problem of accurately measuring the alternating current power developed in a circuit of high frequencies involves consideration of more difficult theories of electricity. Frequencies of hundreds of thousands of cycles per second are not uncommon in fields of present day applied electricity. Such, for example, as in electro therapeutics, wherein it is very important to know the electrical power developed by a therapeutic device in order to know the exact rate at which heat is being produced in a patient connected with the device. Due, however, to the difficulty of the calculations involved in converting an expression of electrical power to that of heat, it is desirable, from the standpoint of the average person, that an electrical measuring device be provided which will indicate the actual heat supplied by an electro therapeutic device rather than, as was heretofore common, the current, the proper magnitude of which for producing the required heat being determined experimentally, frequently to the discomfort and inconvenience of the patient.

A primary object of this invention is to provide an electrical measuring instrument which is adapted to accurately measure the power in high frequency circuits, such as that developed for use in electro therapeutic devices.

An important object of the invention is to provide a high frequency wattmeter with means for indicating the heat energy produced by the electrical power of a high frequency circuit.

Another object of the invention is to provide a novel construction for electrical measuring instruments for high frequency circuits.

Numerous other objects and advantages of the invention will be apparent as it is better understood from the following description which, when taken in connection with the accompanying drawings, discloses a preferred embodiment thereof.

Referring to the drawings:

Figure 1 shows a wiring diagram of an electrical measuring instrument embodying the principles of the invention;

Fig. 2 shows a simplified diagram of the connections shown in Fig. 1;

Fig. 3 is a side elevation of the indicating apparatus with the case removed;

Fig. 4 is a section taken substantially on the line 4—4 of Fig. 3;

Figure 5:
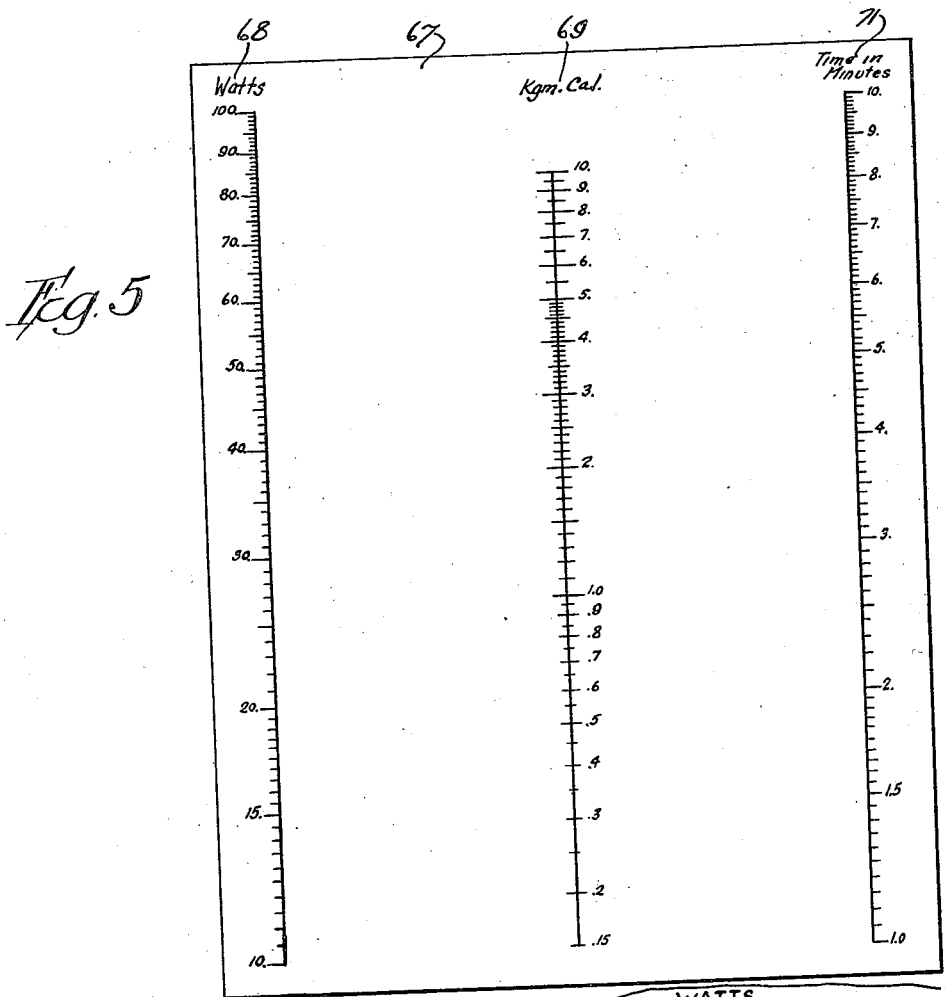
Fig. 5 is a plan view of a conversion chart which is applicable to the instrument.

For the purpose of illustrating the invention, Fig. 1 shows diagrammatically an electrical measuring instrument which is adapted for use in high frequency circuits, such as are found in electro therapeutics. It will be apparent, however, that the measuring instrument is not confined to use in electro therapeutic circuits but is adaptable alike to other high frequency circuits of applied electricity. The measuring instrument shown in Fig. 1 has line terminals 11 and 12 and load terminals 13 and 14. The terminals 11 and 12 are provided to be connected across a suitable electrical energy supply and the load terminals 13 and 14 are provided to facilitate connecting the instrument across an electro therapeutic device (not shown) which is applicable to a patient.

A galvanometer 15 having a cover 16 is employed as an indicator for the electrical measuring device. Fig. 3 shows the galvanometer 15 with the cover 16 removed. The galvanometer 15 is of usual construction and includes a base 17 of any suitable material, a horseshoe magnet 18 mounted on the base 17 by means of countersunk bolts 19 projecting from the face of the base and embraced by sleeves 21, and supporting brackets 22 suitably insulated from the sleeved bolts 19 and secured to the magnet 18. The galvanometer 15 is provided with a suitable indicating movement 23 which is schematically shown in Fig. 3 and which is suitably mounted between the pole pieces of the magnet 18. The outer end of the indicating movement 23 has secured thereto a suitable indicating pointer 24 which is arranged to be actuated by the indicating movement.

A usual scale 25 registering with a corresponding sight opening 26 in the cover 16 is formed on a disc 27. The disc 27 is held in place between the magnet 18 and the pointer 24 by means of a post 28 which projects inwardly from the base 17 and which is suitably secured to the rear face of the disc, and a bracket 29 secured on one end to the magnet 18 and on the other end to the rear face of the disc. As shown in Fig. 3, the disc 27 is positioned behind the pointer 24 and is arranged with a suitable pointer aperture, not shown, which penetrates the disc at 31.

The galvanometer 15 has mounted on its base 17 a pair of terminals 32 which are electrically connected with the indicating movement 23 by means of wire leads 33. The terminals 32 are spaced apart and suitably insulated from the base 17. The base 17 is or may be of any suitable insulating composition, such as bakelite, having a metal plate 34 secured to its inner face, or it may be formed from a single piece of metal without departing from the scope of the present invention.

Figure 7:
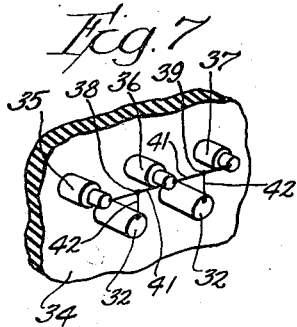
Fig. 7 is a perspective view of a portion of the instrument base plate, showing the physical structure of the thermo-couples.

Three terminals 35, 36, and 37 are mounted on the inner face of the base 17 and project inwardly therefrom just above the terminals 32. The terminals 35, 36, and 37 are spaced apart and suitably insulated from the base 17. A plurality of thermo-couples 38 and 39, having thermal pairs 41 and 42, are connected with thermal conductors 41 extending between the terminals 35 and 36 and between the terminals 36 and 37 and with thermal conductors 42 welded or otherwise suitably secured to the corresponding thermal conductors 41 and connected to the terminals 32. The thermo-couples 38 and 39 are connected together at the terminal 36 so that they are in electrical opposition. The thermo-couples 38 and 39 are physically constructed of wires of material having different electrical and thermo characteristics. A single wire 41 extends between the terminals 35 and 37 and wires 42 of different metal are connected as shown in Fig. 7 between the middle of the portions of the wire 41 and the terminals 32.

A mica or other suitable supporting plate 43 is secured to the outer face of the base 17 by means of screws 44 and 45. The screw 45 projects outwardly from the base 17 and is provided with a spacing sleeve 46 and a nut 47, the nut 47 being threaded on the outer end of the screw 45 whereby to hold the mica plate 43 against the outer end of the sleeve 46. The screws 44 project through the plate 43 and spacing sleeve 48 adjacent the plate and through the base 17, one of the screws extending inwardly from the base 17, as shown at 49 in Fig. 3. The plate 43 carries a resistance winding which is shown as comprising suitable resistance wire 51 threaded alternately through a plurality of lower perforations 52 and upper perforations 53.

The ends of the resistance wire 51 are connected to the terminals 35 and 37 and the electrical center 54 of the wire 51 is connected to the screw 45. The resistance 51 is thus divided and each side is of such magnitude that the resistance of the galvanometer 15 and the thermo-couples 38 and 39 is comparatively negligible with respect to the branches of the resistance 51 in order to promote sensitivity of the galvanometer and to provide against short circuiting it. The end 49 of the screw 44 provides a stud terminal 55 which is suitably insulated from the remainder of the circuit and electrically connected to the terminal 37 in order to provide thermal symmetry compensating for the connection between the terminal 35 and a binding post 56 and between the terminal 36 and another binding post 57. The binding posts 56 and 57 comprise screws 58 which project through the base 17 and outwardly therefrom, and nuts 59 threaded on the outer end of the screws 58 so that one of the nuts 59 rests flush against the outer face of the base 17 and the other nut 59 is adapted to be threaded against a lead 61 with an end suitably held between the two nuts.

The binding post 57 is connected to one side of a resistance 62. The resistance 62 comprises a plurality of mica or other suitable core plates 63 carrying resistance windings 64, as shown diagrammatically in Fig. 1. The windings 64 on adjacent plates 63 are shown connected in parallel pairs with adjacent pairs connected in series. The windings 64 are placed on the plates 63 in order to provide a large radiating surface for dissipating the heat generated in the windings and caused by the electrical current passing through the conductors. The other side of the resistance 62 is connected through a suitable fuse 65 to the terminal 11 and the terminal 13, as shown at 66 in Fig. 1. Preferably, the wires used for internal connections of the measuring instrument or the wattmeter are of small gauge in order to provide against internal capacitance effects. The other instrument terminals 45 and 56 are connected to the line terminal 12 and the load terminal 14, respectively.

Figure 6:
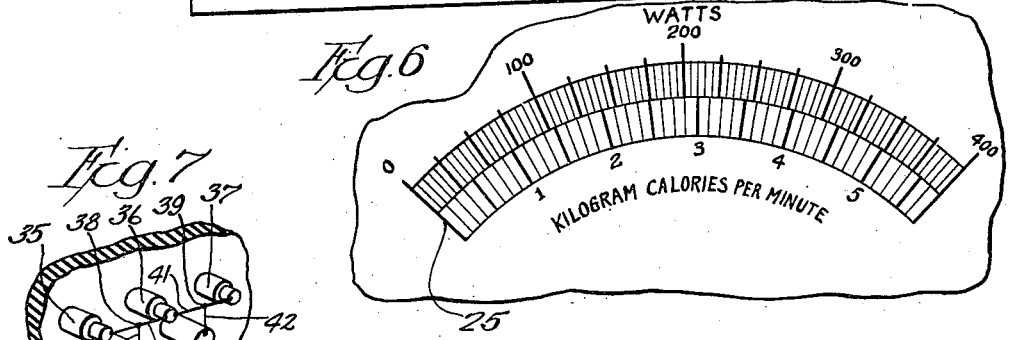
Fig. 6 is a plan view of the instrument scale.

While Fig. 6 shows the scale 25 calibrated in watts and the equivalent kilogram calories per minute, a conversion chart 67, such as is shown in Fig. 5, is contemplated as coming within the scope of the present invention. The conversion chart 67 is provided with an electrical power scale 68, a heat scale 69, and a time scale 71, drawn so that the relation between electrical power and heat energy has the proper constant relation. It will be readily understood that a straight line drawn through the electrical power or watt scale at the number of watts indicated by the watt scale on the meter and through the number of minutes of application on the time scale will pass through the heat scale and indicate the heat energy being produced by the electric power.

In operation, the line terminals 11 and 12 are connected to the source of energy supply and the load terminals 13 and 14 are connected to the therapeutic device (not shown). The high frequency current delivered from the source of energy supply divides equally at the center tap 54 of the resistance 51, so that a part of the current is conducted around through the portion of the resistance 51, shown on the right in Fig. 2, dividing at the terminal 36 after having passed through the right thermal conductor 41, and a part of the current thus divided passes through the resistance 62 and the remainder passes through the other thermal conductor 41 to the terminal 35, and so on to the therapeutic device. It will be apparent, therefore, that the current carried by the resistance 62 is the difference between the current in the right portion of the resistance 51 and the remainder of the current which passes the terminal 36 through the thermal conductor 41, and so on to the load. The current which heats the thermo-couple 38 is the difference between the current which heats the thermo-couple 39 and that which passes through the resistance 62.

It will be seen that the thermal electromotive force produced by the thermo-couples 38 and 39 is proportional to the difference of the squares of the current producing the heat, and that, therefore, the deflection of the pointer 4 along the scale 25, being proportional to the thermal E. M. F. produced in the thermo-couples, is proportional to the power delivered to the therapeutic device or load. Mathematically, this relation may be stated or proved in terms of power supplied to the load and calculated by the formula expressing power in terms of the product of the voltage and the current. The voltage across the load being the same as the voltage across the resistance 62 may be expressed as a product of the resistance 62, and the difference between the current through the right portion of the resistance 51 and the current heating the thermo-couple 38. The current supplied to the load may be expressed as the sum of the current passed through the left portion of the resistance 51 or, this current being equal to that passing through the right portion of the resistance, the current through the right portion of the resistance 51 and the current that heats the thermo-couple 38. Thus the power is expressed in the product of a difference of currents, the sum of the same currents, and a resistance, or a product of the difference of two squares and a resistance, the two squares being the current supplied in heating the thermo-couples 38 and 39.

Expressing this relation in formulæ—

$$P = V_L I_L$$
$$\text{but } V_L = (i - i_1) R$$
$$\text{and } I_L = (i + i_1)$$
$$\text{therefore } P = (i^2 - i_1^2) R.$$

When the resistance of the thermo-couples is negligible with respect to the resistances 51 and where P is the power supplied to the load, $V_L$ is the load voltage, $I_L$ is load current, $i$ is the current which is in each portion of the resistance 51 and which heats the thermo-couple 39. $i_1$ is the current heating the thermo-couple 38, and R is the resistance of the coils 62.

Since the power supplied to the load is proportional to $(i^2 - i_1^2)$, and since it has been shown that the deflection of the pointer 24 is proportional to $(i^2 - i_1^2)$, it follows that the galvanometer may be calibrated to indicate the electrical power at the load, as shown in Fig. 6. Electrical power being a mathematical function of the heat produced by electrical energy in the conductor, a conversion chart, such as that shown in Fig. 5, may be constructed showing the relation between the electrical power indicated by the galvanometer and the heat energy produced and the time of application or the scale 25 may be calibrated in terms of heat power, as shown in Fig. 6, from which the heat produced with respect to time may be calculated by multiplying by the time of application.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for measuring electrical power comprising high frequency supply leads, high frequency load leads, connections between said supply leads and said load leads which include a divided and balanced resistance connected at its center to a supply lead and at one side to a load lead and at the other side to a thermo-couple and from said thermo-couple to the other supply lead through a resistance, a second thermo-couple connected to the first mentioned side of said resistance and to the connection between the first mentioned thermo-couple and the last mentioned supply lead.

2. An apparatus for measuring electrical power comprising high frequency supply leads, high frequency load leads, connections between said supply leads and said load leads, a shunt extending between said supply leads and containing a resistance, balancing resistance in said connections and a thermo-couple, a thermo-couple connected between said connections and said shunt, and means controlled by said thermo-couple for indicating the rate of energy consumption or power in the load circuit.

3. An apparatus for measuring electrical power comprising high frequency supply leads, high frequency load leads, connections between said supply leads and said load leads, a shunt extending between said supply leads and containing a resistance, balancing resistance in said connections and a thermo-couple, a thermo-couple connected between said connections and said shunt, a second resistance in said shunt, balancing to a degree the load in the load circuit, and a galvanometer controlled by said thermo-couples.

DONALD E. RICHARDSON.